US006915235B2

(12) United States Patent
Reeves et al.

(10) Patent No.: US 6,915,235 B2
(45) Date of Patent: Jul. 5, 2005

(54) GENERATION OF DATA INDICATIVE OF MACHINE OPERATIONAL CONDITION

(75) Inventors: Todd Reeves, Knoxville, TN (US); Christopher Hilemon, Knoxville, TN (US); Keith Walton, Kingston, TN (US)

(73) Assignee: CSI Technology, Inc., Knoxville, TN (US)

( * ) Notice: Subject to any disclaimer, the term of this patent is extended or adjusted under 35 U.S.C. 154(b) by 0 days.

(21) Appl. No.: 10/388,050

(22) Filed: Mar. 13, 2003

(65) Prior Publication Data

US 2004/0181364 A1 Sep. 16, 2004

(51) Int. Cl.[7] ............................................. G06F 15/04
(52) U.S. Cl. .................... 702/182; 702/181; 702/183; 702/188
(58) Field of Search .................................. 702/182, 188, 702/179–181, 183; 700/79; 701/29; 703/19

(56) References Cited

U.S. PATENT DOCUMENTS

| | | | |
|---|---|---|---|
| 3,705,516 A | 12/1972 | Reis ............................. | 73/71.4 |
| 4,322,976 A | 4/1982 | Sisson et al. .................. | 73/659 |
| 4,408,285 A | 10/1983 | Sisson et al. ................. | 364/508 |
| 4,425,798 A | 1/1984 | Nagai et al. ................... | 73/659 |
| 4,435,770 A | 3/1984 | Shiohata et al. ............. | 364/508 |
| 4,493,042 A | 1/1985 | Shima et al. ................. | 364/507 |

(Continued)

FOREIGN PATENT DOCUMENTS

| | | |
|---|---|---|
| EP | 0 964 325 A1 | 12/1999 |
| EP | 0 965 897 A1 | 12/1999 |
| GB | 2 347 234 A | 8/2000 |
| WO | WO 02/095633 | 11/2002 |
| WO | WO 03/075206 | 9/2003 |

OTHER PUBLICATIONS

International Search Report issued in PCT/US2004/004939 issued on Sep. 8, 2004.

Written Opinion issued in PCT/US2004/004939 application mailed Sep. 29, 2004.

U.S. Appl. No. 10/484,907, filed Jan. 26, 2004, Eryurek et al.

U.S. Appl. No. 09/257,896, filed Feb. 25, 1999.

U.S. Appl. No. 09/499,455, filed Feb. 7, 2000, "Diagnostics Expert in a Process Control System".

(Continued)

*Primary Examiner*—Marc S. Hoff
*Assistant Examiner*—Felix Suarez
(74) *Attorney, Agent, or Firm*—Marshall, Gerstein & Borun LLP

(57) ABSTRACT

Information related to an operational condition of a machine in a process plant is generated, where the generated information is in a first data format. The information may be generated based on data in a second format. The second format may, for example, correspond to a format used by a certain type or types of process entities, whereas the first format may, for example, correspond to a format used to process operational condition information of other types of process entities in the process plant. Providing operational condition data for various types of process entities in a common format may, for example, assist an operator in ascertaining the relative importance of the operational condition for various types of entities.

37 Claims, 7 Drawing Sheets

U.S. PATENT DOCUMENTS

| | | | |
|---|---|---|---|
| 4,527,271 A | 7/1985 | Hallee et al. | 371/20 |
| 4,607,325 A | 8/1986 | Horn | 364/157 |
| 4,657,179 A | 4/1987 | Aggers et al. | 236/51 |
| 4,683,542 A | 7/1987 | Taniguti | 364/508 |
| 4,734,873 A | 3/1988 | Malloy et al. | 364/571 |
| 4,758,964 A | 7/1988 | Bittner et al. | 364/308 |
| 4,763,243 A | 8/1988 | Barlow et al. | 364/200 |
| 4,764,862 A | 8/1988 | Barlow et al. | 364/200 |
| 4,885,694 A | 12/1989 | Pray et al. | 364/464.01 |
| 4,885,707 A | 12/1989 | Nichol et al. | 364/551.01 |
| 4,907,167 A | 3/1990 | Skeirik | 364/500 |
| 4,910,691 A | 3/1990 | Skeirik | 364/513 |
| 4,944,035 A | 7/1990 | Aagardl et al. | 364/556 |
| 4,956,793 A | 9/1990 | Bonne et al. | 364/558 |
| 4,965,742 A | 10/1990 | Skeirik | 364/513 |
| 4,980,844 A | 12/1990 | Demjanenko et al. | 364/550 |
| 5,006,992 A | 4/1991 | Skeirik | 364/513 |
| 5,008,810 A | 4/1991 | Kessel et al. | 364/200 |
| 5,015,934 A | 5/1991 | Holley et al. | 318/611 |
| 5,018,215 A | 5/1991 | Nasr et al. | 382/15 |
| 5,043,863 A | 8/1991 | Bristol et al. | 364/165 |
| 5,050,095 A | 9/1991 | Samad | 364/513 |
| 5,070,458 A | 12/1991 | Gilmore et al. | 364/484.06 |
| 5,094,107 A | 3/1992 | Schoch | 751/570 |
| 5,121,467 A | 6/1992 | Skeirik | 395/11 |
| 5,134,574 A | 7/1992 | Beaverstock et al. | 364/551.01 |
| 5,140,530 A | 8/1992 | Guha et al. | 395/13 |
| 5,142,612 A | 8/1992 | Skeirik | 395/11 |
| 5,161,013 A | 11/1992 | Rylander et al. | 358/160 |
| 5,167,009 A | 11/1992 | Skeirik | 395/27 |
| 5,187,674 A | 2/1993 | Bonne | 364/558 |
| 5,193,143 A | 3/1993 | Kaemmerer et al. | 395/51 |
| 5,197,114 A | 3/1993 | Skeirik | 395/22 |
| 5,210,704 A | 5/1993 | Husseiny | 702/34 |
| 5,212,765 A | 5/1993 | Skeirik | 395/11 |
| 5,224,203 A | 6/1993 | Skeirik | 395/22 |
| 5,251,151 A | 10/1993 | Demjanenko et al. | 364/550 |
| 5,282,261 A | 1/1994 | Skeirik | 395/22 |
| 5,291,190 A | 3/1994 | Scarola et al. | 340/825.06 |
| 5,301,101 A | 4/1994 | MacArthur et al. | 361/683 |
| 5,311,447 A | 5/1994 | Bonne | 364/509 |
| 5,333,298 A | 7/1994 | Bland et al. | 395/500 |
| 5,351,184 A | 9/1994 | Lu et al. | 364/165 |
| 5,353,207 A | 10/1994 | Keeler et al. | 364/164 |
| 5,369,599 A | 11/1994 | Sadjadi et al. | 364/516 |
| 5,373,452 A | 12/1994 | Guha | 364/550 |
| 5,384,698 A | 1/1995 | Jellnek | 364/149 |
| 5,390,326 A | 2/1995 | Shah | 395/575 |
| 5,396,415 A | 3/1995 | Konar et al. | 364/168 |
| 5,398,303 A | 3/1995 | Tanaka | 395/51 |
| 5,400,246 A | 3/1995 | Wilson et al. | 700/17 |
| 5,408,406 A | 4/1995 | Mathur et al. | 364/163 |
| 5,442,544 A | 8/1995 | Jelinek | 364/49 |
| 5,486,920 A | 1/1996 | Killpatrick et al. | 356/350 |
| 5,486,996 A | 1/1996 | Samad et al. | 364/512 |
| 5,488,697 A | 1/1996 | Kaemmerer et al. | 395/51 |
| 5,511,422 A | 4/1996 | Hernandez | 73/593 |
| 5,537,310 A | 7/1996 | Tanake et al. | 364/151 |
| 5,541,833 A | 7/1996 | Bristol et al. | 364/165 |
| 5,546,301 A | 8/1996 | Agrawal et al. | 364/140 |
| 5,559,690 A | 9/1996 | Keeler et al. | 364/164 |
| 5,561,599 A | 10/1996 | Lu | 364/164 |
| 5,566,065 A | 10/1996 | Hansen et al. | 364/164 |
| 5,570,282 A | 10/1996 | Hansen et al. | 364/148 |
| 5,572,420 A | 11/1996 | Lu | 364/153 |
| 5,574,638 A | 11/1996 | Lu | 364/165 |
| 5,596,704 A | 1/1997 | Geddes et al. | 395/326 |
| 5,602,757 A | 2/1997 | Haseley et al. | 364/551.01 |
| 5,602,761 A * | 2/1997 | Spoerre et al. | 702/179 |
| 5,610,339 A | 3/1997 | Haseley et al. | 73/660 |
| 5,640,491 A | 6/1997 | Bhat et al. | 395/22 |
| 5,646,350 A | 7/1997 | Robinson et al. | 73/602 |
| 5,666,297 A | 9/1997 | Britt et al. | 364/518 |
| 5,680,409 A | 10/1997 | Qin et al. | 371/48 |
| 5,687,090 A | 11/1997 | Chen et al. | 364/496 |
| 5,692,158 A | 11/1997 | Degeneff et al. | 395/500 |
| 5,698,788 A | 12/1997 | Mol et al. | 73/659 |
| 5,704,011 A | 12/1997 | Hansen et al. | 395/22 |
| 5,715,158 A | 2/1998 | Chen | 364/150 |
| 5,729,661 A | 3/1998 | Keeler et al. | 395/213 |
| 5,740,324 A | 4/1998 | Mathur et al. | 395/22 |
| 5,742,513 A | 4/1998 | Bouhenguel et al. | 364/492 |
| 5,761,518 A | 6/1998 | Boehling et al. | 395/821 |
| 5,777,872 A | 7/1998 | He | 364/149 |
| 5,781,432 A | 7/1998 | Keeler et al. | 364/164 |
| 5,790,898 A | 8/1998 | Kishima et al. | 395/899 |
| 5,796,609 A | 8/1998 | Tao et al. | 364/164 |
| 5,798,939 A | 8/1998 | Ochoa et al. | 364/493 |
| 5,809,490 A | 9/1998 | Gulver et al. | 706/16 |
| 5,819,050 A | 10/1998 | Boehling et al. | 395/284 |
| 5,819,232 A | 10/1998 | Shipman | 705/8 |
| 5,825,645 A | 10/1998 | Konar et al. | 364/148 |
| 5,826,249 A | 10/1998 | Skeirik | 706/25 |
| 5,842,189 A | 11/1998 | Keeler et al. | 706/16 |
| 5,847,952 A | 12/1998 | Samad | 364/148 |
| 5,859,773 A | 1/1999 | Keeler et al. | 364/164 |
| 5,875,420 A | 2/1999 | Piety et al. | 702/182 |
| 5,877,954 A | 3/1999 | Klimasauskas et al. | 364/149 |
| 5,892,679 A | 4/1999 | He | 364/149 |
| 5,892,939 A | 4/1999 | Call et al. | 395/500 |
| 5,898,869 A | 4/1999 | Anderson | 395/652 |
| 5,901,058 A | 5/1999 | Steinman et al. | 364/130 |
| 5,905,989 A | 5/1999 | Biggs | 707/104 |
| 5,907,701 A | 5/1999 | Hanson | 395/671 |
| 5,909,370 A | 6/1999 | Lynch | 364/148.05 |
| 5,909,541 A | 6/1999 | Sampson et al. | 395/182.04 |
| 5,909,586 A | 6/1999 | Anderson | 395/750.08 |
| 5,917,840 A | 6/1999 | Cheney et al. | 371/53 |
| 5,918,233 A | 6/1999 | La Chance et al. | 707/104 |
| 5,922,963 A | 7/1999 | Piety et al. | 73/659 |
| 5,924,086 A | 7/1999 | Mathur et al. | 706/25 |
| 5,940,290 A | 8/1999 | Dixon | 364/138 |
| 5,948,101 A | 9/1999 | David et al. | 713/2 |
| 5,949,417 A | 9/1999 | Calder | 345/342 |
| 5,960,214 A | 9/1999 | Sharpe, Jr. et al. | 395/835 |
| 5,960,441 A | 9/1999 | Bland et al. | 707/104 |
| 5,984,502 A | 11/1999 | Calder | 364/188 |
| 5,988,847 A | 11/1999 | McLaughlin et al. | 364/138 |
| 6,008,985 A | 12/1999 | Lake et al. | 361/686 |
| 6,017,143 A | 1/2000 | Eryurek et al. | 364/148.06 |
| 6,033,257 A | 3/2000 | Lake et al. | 439/502 |
| 6,041,263 A | 3/2000 | Boston et al. | 700/32 |
| 6,047,221 A | 4/2000 | Piche et al. | 700/44 |
| 6,055,483 A | 4/2000 | Lu | 702/31 |
| 6,067,505 A | 5/2000 | Bonoyer et al. | 702/85 |
| 6,076,124 A | 6/2000 | Korowitz et al. | 710/102 |
| 6,078,843 A | 6/2000 | Shavit | 700/48 |
| 6,093,211 A | 7/2000 | Hamielec et al. | 703/12 |
| 6,106,785 A | 8/2000 | Havlena et al. | 422/109 |
| 6,108,616 A | 8/2000 | Borchers et al. | 702/183 |
| 6,110,214 A | 8/2000 | Klimasauskas | 703/2 |
| 6,122,555 A | 9/2000 | Lu | 700/9 |
| 6,128,279 A | 10/2000 | O'Neil et al. | 370/229 |
| 6,298,454 B1 | 10/2001 | Schleiss et al. | 714/37 |
| 6,317,638 B1 * | 11/2001 | Schreder et al. | 700/79 |
| 6,397,114 B1 | 5/2002 | Eryurek et al. | 700/51 |
| 6,421,571 B1 | 7/2002 | Spriggs et al. | 700/17 |

| | | |
|---|---|---|
| 6,445,963 B1 | 9/2002 | Blevins et al. .................. 700/44 |
| 6,507,797 B1 | 1/2003 | Kliman et al. .................. 702/75 |
| 6,549,130 B1 * | 4/2003 | Joao ........................... 307/10.2 |
| 6,651,012 B1 * | 11/2003 | Bechhoefer ................... 702/34 |
| 2002/0147511 A1 | 10/2002 | Eryurek et al. ................ 700/80 |
| 2002/0161940 A1 | 10/2002 | Eryurek et al. ................ 710/15 |
| 2002/0163427 A1 | 11/2002 | Eryurek et al. .............. 340/500 |
| 2003/0028268 A1 | 2/2003 | Eryurek et al. ................ 700/19 |

OTHER PUBLICATIONS

U.S. Appl. No. 09/593,327, filed Jun. 14, 2000, "Integrated Optimal Model Predictive Control in a Process Control System".

"GE Predictor™ Services: GE Predictor Services Overview," GE Industrial Systems, available at http://www.geindustrial.com/cwc/services?id=71 on Jul. 18, 2002.

"Electrical Equipment Coverage," GE Industrial Systems, available at http://www.geindustrial.com/cwc/services?id=72 on Jul. 18, 2002.

"Customer Impact," GE Industrial Systems, available at http://www.geindustrial.com/cwc/services?id=73 on Jul. 18, 2002.

"Components of GE Predictor™ Services," GE Industrial Systems, available at http://www.geindustrial.com/cwc/services?id=74 on Jul. 18, 2002.

"Customer Benefits," GE Industrial Systems, available at http://www.geindustrial.com/cwc/services?id=75 on Jul. 18, 2002.

* cited by examiner

GENERATION OF DATA INDICATIVE OF MACHINE OPERATIONAL CONDITION

FIELD OF THE DISCLOSURE

The present disclosure generally relates to process plant maintenance, control, and viewing applications and, more particularly, to the generation and use of information related to operational condition of process entities in a process plant.

DESCRIPTION OF THE RELATED ART

Process control systems, like those used in chemical, petroleum or other processes, typically include one or more centralized or decentralized process controllers communicatively coupled to at least one host or operator workstation and to one or more process control and instrumentation devices, such as field devices, via analog, digital or combined analog/digital buses. Field devices, which may be, for example valves, valve positioners, switches, transmitters, and sensors (e.g., temperature, pressure and flow rate sensors), perform functions within the process such as opening or closing valves and measuring process parameters. The process controller receives signals indicative of process measurements or process variables made by or associated with the field devices and/or other information pertaining to the field devices, uses this information to implement a control routine and then generates control signals which are sent over one or more of the buses to the field devices to control the operation of the process. Information from the field devices and the controller is typically made available to one or more applications executed by an operator workstation to enable an operator to perform desired functions with respect to the process, such as viewing the current state of the process, modifying the operation of the process, etc.

While a typical process plant has many process control and instrumentation devices, such as valves, transmitters, sensors, etc. connected to one or more process controllers which execute software that controls these devices during the operation of the process, there are many other supporting devices which are also necessary for or related to process plant operation. These additional devices include, for example, power supply equipment, power generation and distribution equipment, rotating equipment such as turbines, etc., which are located at numerous places in a typical plant. While this additional equipment does not necessarily create or use process variables and, in many instances, is not controlled or even coupled to a process controller for the purpose of affecting the process operation, this equipment is nevertheless important to and ultimately necessary for proper operation of the process and the process plant. In the past however, process controllers were not necessarily aware of these other devices or the process controllers simply assumed that these devices were operating properly when performing process control.

With regard to rotating equipment (e.g., machines that comprise rotating elements, such as bearings, shafts, gears, etc.), a piece of machinery will exhibit reasonable levels of vibration which are characteristic of its normal operation. Based upon knowledge of the rotational speed of individual machine elements, machine maintenance personnel can monitor the machine's vibration level at certain characteristic frequencies to acquire an indication of the overall condition of the machine. As the mechanical integrity of a machine element begins to degrade, the vibration level associated with that element changes from its normal characteristic level, indicating to the machine maintenance personnel that corrective action will soon be necessary. By implementing a machine monitoring program, the machine's vibration levels can be measured on a regular schedule, and early detection of abnormal machine operation is possible. With such early warning, repair of the machine may be scheduled well before a machine breakdown and the associated work stoppage occurs. In this manner, machine "down-time" may be scheduled well in advance so as to minimize the impact on manufacturing operations.

A typical machine monitoring program may include dozens or even hundreds of rotating machines. For each of these machines, vibration spectra are typically collected at a number of locations on the machine. Specific spectral features in the measured data may include harmonic families or difference families, which are associated with certain types of machinery faults. From this collected data, an analyst determines which machines are operating with a fault condition. For the machines that are in fact operating with a fault condition, the type of fault, its location, and its severity may be determined. The severity may be represented as a value from a severity index, where the severity index provides a quantitative indication of a deviation from a normal operating condition.

Many process plants have other computers associated therewith which execute applications related to business functions or maintenance functions. For example, some plants include computers which execute applications associated with ordering raw materials, replacement parts or devices for the plant, applications related to forecasting sales and production needs, etc. Likewise, many process plants, and especially those which use smart field devices, include applications which are used to help monitor and maintain the devices within the plant regardless of whether these devices are process control and instrumentation devices or are other types of devices. For example, the Asset Management Solutions (AMS) application sold by Fisher-Rosemount Systems, Inc. enables communication with and stores data pertaining to field devices to ascertain and track the operating state of the field devices. An example of such a system is disclosed in U.S. Pat. No. 5,960,214 entitled "Integrated Communication Network for use in a Field Device Management System." In some instances, the AMS application may be used to communicate with devices to change parameters within the device, to cause the device to run applications on itself, such as self calibration routines or self diagnostic routines, to obtain information about the status or health of the device, etc. This information may be stored and used by a maintenance person to monitor and maintain these devices.

Maintenance personnel who are primarily responsible for assuring that the actual equipment within the process is operating efficiently and for repairing and replacing malfunctioning equipment, use tools such as maintenance interfaces, the AMS application discussed above, as well and many other diagnostic tools which provide information about operating states of the devices within the process. Maintenance persons also schedule maintenance activities which may require shut down of portions of the plant. For many newer types of process devices and equipment, generally called smart field devices, the devices themselves may include detection and diagnostic tools which automatically sense problems with the operation of the device and automatically report these problems to a maintenance person via a standard maintenance interface. For example, the AMS software reports device status and diagnostic information to the maintenance person and provides communication and other tools that enable the maintenance person to determine what is happening in devices and to access device information provided by devices.

In the past, maintenance persons were provided with a wide variety of diagnostic information from the various entities within the process plant. For instance, monitoring and/or diagnostic information related to smart field devices typically were provided to maintenance persons via one or more formats and user interfaces. Similarly, monitoring/diagnostic information related to power generation and distribution equipment were provided to maintenance persons via another set of formats and user interfaces. Further, monitoring/diagnostic information related to rotating equipment were provided to maintenance persons via yet another set of formats and user interfaces. Because monitoring/diagnostic information for the various types of process entities were provided in multiple formats and via multiple user interfaces, typically led to a sub-optimal use of this information.

In a typical process plant, very different applications may be used to perform the different functions within a plant, e.g., process control operations, maintenance operations and business operations and are separated. The different applications used for these different tasks are typically not integrated and, thus, do not share data or information. In fact, many plants only include some, but not all, of these different types of applications. Furthermore, even if all of the applications are located within a plant, because different personnel use these different applications and analysis tools and because these tools are generally located at different hardware locations within the plant, there is little if any flow of information from one functional area of the plant to another, even when this information may be useful to other functions within the plant. For example, a tool, such as a rotating equipment data analysis tool, may be used by a maintenance person to detect a poorly functioning power generator or piece of rotating equipment (based on non-process variable type data). This tool may detect a problem and alert the maintenance person that the device needs to be calibrated, repaired or replaced. However, the process control operator (either a human or a software expert) does not have the benefit of this information, even though the poorly operating device may be causing a problem that is affecting a loop or some other component which is being monitored by the process control operation. Likewise, the business person is not aware of this fact, even though the malfunctioning device may be critical to and may be preventing optimization of the plant in a manner that the business person may desire. Because the process control expert is unaware of a device problem which may be ultimately causing poor performance of a loop or unit in the process control system and because the process control operator or expert assumes that this equipment is operating perfectly, the process control expert may misdiagnose the problem it detects within the process control loop or may try to apply a tool, such as a loop tuner, which could never actually correct the problem. Likewise, the business person may make a business decision to run the plant in a manner that will not achieve the desired business effects (such as optimizing profits) because of the malfunctioning device.

Due to the abundance of data analysis and other detection and diagnostic tools available in the process control environment, there is much information about the health and performance of devices available to a maintenance person which could be helpful to other maintenance persons, a process operator, business persons, etc. However, in the past, the information generated or collected in one functional area of a process plant was not used at all, or not used very well in other functional areas which led to an overall sub-optimal use of the assets within process plants.

SUMMARY

The example systems described herein may be used to generate information related to an operational condition of a machine in a process plant, where the generated information is in a first data format. The information may be generated based on data in a second format. The second format may, for example, correspond to a format used by a certain type or types of process entities, whereas the first format may, for example, correspond to a format used to process operational condition information of other types of process entities in the process plant. Providing operational condition data for various types of process entities in a common format may, for example, assist an operator in ascertaining the relative importance of the operational condition for various types of entities.

In one embodiment, a method is provided in which a first value associated with a monitored machine is received. The first value may be from a range of values in a first index, where the first index is indicative of varying degrees of deviation from an acceptable operational state of the monitored machine. As one example, the first index may be a deviation severity index related to vibration information associated with rotating machines.

Then, a second value is generated based on the first value, where the second value is from a range of values in a second index. The second index may be indicative of varying degrees of relative health of a process entity adapted for use in process plants. As one example, the second index may be a health index related to the relative health of process entities in a process plant.

Next, a notification associated with the monitored machine may be generated, where the notification includes the second value. In one example, the notification may be in the form of an alert.

BRIEF DESCRIPTION OF THE DRAWINGS

The features and advantages of the techniques described herein will be best appreciated upon reference to the following detailed description and the accompanying drawings, in which.

DETAILED DESCRIPTION

Process Plant

Figure 1:
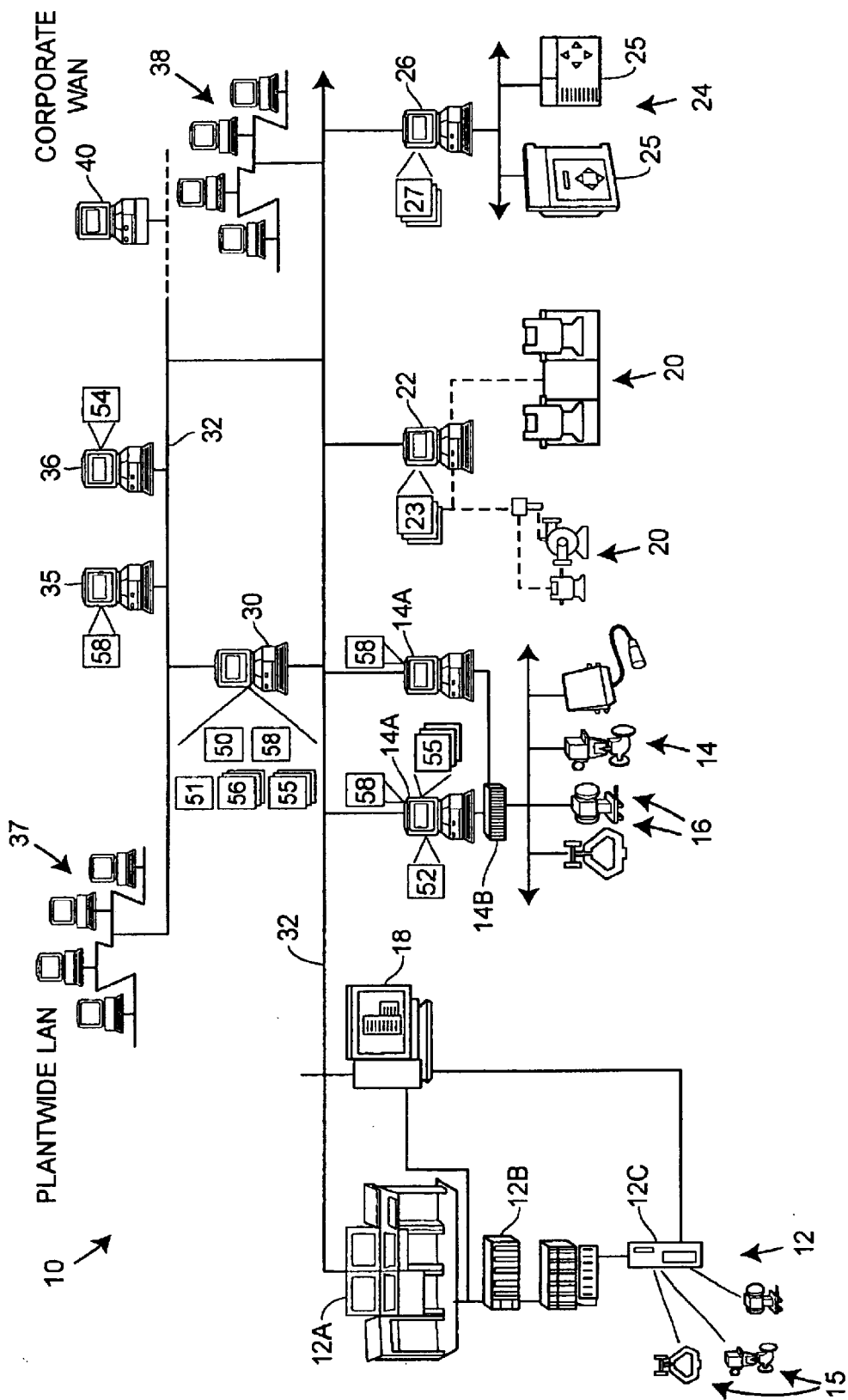
FIG. 1 is a block diagram of an example process plant.

Referring now to FIG. 1, an example process plant 10 includes a number of business and other computer systems interconnected with a number of control and maintenance systems by one or more communication networks. The process plant 10 includes one or more process control systems 12 and 14. The process control system 12 may be a traditional process control system such as a PROVOX or RS3 system or any other DCS which includes an operator interface 12A coupled to a controller 12B and to input/output (I/O) cards 12C which, in turn, are coupled to various field devices such as analog and Highway Addressable Remote Transmitter (HART) field devices 15. The process control system 14, which may be a distributed process control system, includes one or more operator interfaces 14A coupled to one or more distributed controllers 14B via a bus, such as an Ethernet bus. The controllers 14B may be, for example, DeltaV™ controllers sold by Fisher-Rosemount Systems, Inc. of Austin, Tex. or any other desired type of controllers. The controllers 14B are connected via I/O devices to one or more field devices 16, such as for example, HART or Fieldbus field devices or any other smart or non-smart field devices including, for example, those that use any of the PROFIBUS®, WORLDFIP®, Device-Net®, AS-Interface and CAN protocols. As is known, the field devices 16 may provide analog or digital information to the controllers 14B related to process variables as well as to other device information. The operator interfaces 14A may store and execute tools available to the process control operator for controlling the operation of the process including, for example, control optimizers, diagnostic experts, neural networks, tuners, etc.

Still further, maintenance systems, such as computers executing the AMS application or any other device monitoring and communication applications may be connected to the process control systems 12 and 14 or to the individual devices therein to perform maintenance and monitoring activities. For example, a maintenance computer 18 may be connected to the controller 12B and/or to the devices 15 via any desired communication lines or networks (including wireless or handheld device networks) to communicate with and, in some instances, reconfigure or perform other maintenance activities on the devices 15. Similarly, maintenance applications such as the AMS application may be installed in and executed by one or more of the user interfaces 14A associated with the distributed process control system 14 to perform maintenance and monitoring functions, including data collection related to the operating status of the devices 16.

The process plant 10 also includes various rotating equipment 20, such as turbines, motors, etc. which are coupled to a maintenance computer 22 via some permanent or temporary communication link (such as a bus, a wireless communication system or hand held devices which are connected to the equipment 20 to take readings and are then removed). Additionally or alternatively, the maintenance computer 22 may be coupled to monitoring/diagnostic equipment that monitors the rotating equipment 20. The maintenance computer 22 may store and execute known monitoring and diagnostic applications 23 provided by, for example, CSI or other any other known applications used to diagnose, monitor and optimize the operating state of the rotating equipment 20. Maintenance personnel usually use the applications 23 to maintain and oversee the performance of rotating equipment 20 in the plant 10, to determine problems with the rotating equipment 20 and to determine when and if the rotating equipment 20 must be repaired or replaced. Data related to the monitoring, diagnostics, and/or optimization of the rotating equipment may be stored in a database (not shown) coupled to the computer 22.

Similarly, a power generation and distribution system 24 having power generating and distribution equipment 25 associated with the plant 10 is connected via, for example, a bus, to another computer 26 which runs and oversees the operation of the power generating and distribution equipment 25 within the plant 10. The computer 26 may execute known power control and diagnostics applications 27 such a as those provided by, for example, Liebert and ASCO or other companies to control and maintain the power generation and distribution equipment 25.

In the past, the various process control systems 12 and 14 and the power generating and maintenance systems 22 and 26 may not have been interconnected with each other in a manner that enabled them to share data generated in or collected by each of these systems in a useful manner. As a result, each of the different functions such as the process control functions, power generation functions and rotating equipment functions have operated on the assumption that the other equipment within the plant which may be affected by or have an affect on that particular function is operating perfectly which, of course, is almost never the case. However, because the functions are so different and the equipment and personnel used to oversee these functions are different, there typically has been little or no meaningful data sharing between the different functional systems within the plant 10.

To overcome this problem, a computer system 30 is provided which is communicatively connected to the computers or interfaces associated with the various functional systems within the plant 10, including the process control functions 12 and 14, the maintenance functions such as those implemented in the computers 18, 14A, 22 and 26 and the business functions. In particular, the computer system 30 is communicatively connected to the traditional process control system 12 and to the maintenance interface 18 associated with that control system, is connected to the process control and/or maintenance interfaces 14A of the distributed process control system 14, is connected to the rotating equipment maintenance computer 22 and to the power generation and distribution computer 26, all via a network 32. The network 32 may use any desired or appropriate local area network (LAN) or wide area network (WAN) protocol to provide communications.

As illustrated in FIG. 1, the computer 30 is also connected via the same or a different network 32 to business system computers and maintenance planning computers 35 and 36, which may execute, for example, enterprise resource planning (ERP), material resource planning (MRP), accounting, production and customer ordering systems, maintenance planning systems or any other desired business applications such as parts, supplies and raw materials ordering applications, production scheduling applications, etc. The computer 30 may also be connected via, for example, the network 32, to a plant-wide LAN 37, a corporate WAN 38 as well as to a computer system 40 that enables remote monitoring of or communication with the plant 10 from remote locations.

In one embodiment, the communications over the bus 32 occur using the XML protocol. Here, data from each of the computers 12A, 18, 14A, 22, 26, 35, 36, etc. is wrapped in an XML wrapper and is sent to an XML data server which may be implemented by, for example, the computer 30. Because XML is a descriptive language, the server can process any type of data. At the server, if necessary, the data is encapsulated with a new XML wrapper, i.e., this data is mapped from one XML schema to one or more other XML schemas which are created for each of the receiving applications. Thus, each data originator can wrap its data using a schema understood or convenient for that device or application, and each receiving application can receive the data in a different schema used for or understood by the receiving application. The server is configured to map one schema to another schema depending on the source and destination(s) of the data. If desired, the server may also perform certain data processing functions or other functions based on the receipt of data. The mapping and processing function rules are set up and stored in the server prior to operation of the system described herein. In this manner, data may be sent from any one application to one or more other applications.

Generally speaking, the computer 30 stores and executes an asset utilization expert 50 that collects data and other information generated by the process control systems 12 and 14, the maintenance systems 18, 22 and 26 and the business systems 35 and 36 as well as information generated by data analysis tools executed in each of these systems. The asset utilization expert 50 may be based on, for example, the OZ expert system currently provided by NEXUS. However, the asset utilization expert 50 may be any other desired type of expert system including, for example, any type of data mining system. Importantly, the asset utilization expert 50 operates as a data and information clearinghouse in the process plant 10 and is able to coordinate the distribution of data or information from one functional area, such as the maintenance area, to other functional areas, such as the process control or the business functional areas. The asset utilization expert 50 may also use the collected data to generate new information or data which can be distributed to one or more of the computer systems associated with the different functions within the plant 10. Still further, the asset utilization expert 50 may execute or oversee the execution of other applications that use the collected data to generate new types of data to be used within the process plant 10.

In particular, the asset utilization expert 50 may include or execute index generation software 51 that creates indices associated with devices, like process control and instrumentation devices, power generation devices, rotating equipment, units, areas, etc, or that are associated with process control entities, like loops, etc. within the plant 10. These indices can then be provided to the process control applications to help optimize process control and can be provided to the business software or business applications to provide the business persons more complete or understandable information associated with the operation of the plant 10. The asset utilization expert 50 can also provide maintenance data (such as device status information) and business data (such as data associated with scheduled orders, timeframes, etc.) to a control expert 52 associated with, for example, the process control system 14 to help an operator perform control activities such as optimizing control. The control expert 52 may be implemented by, for example, the user interface 14A or any other computer associated with the control system 14 or within the computer 30 if desired.

In one embodiment, the control expert 52 may be, for example, the control expert described in U.S. patent application Ser. No. 09/256,585, entitled "Diagnostics in a Process Control System," filed on Feb. 22, 1999, and in U.S. patent application Ser. No. 09/499,445, entitled "Diagnostic Expert in a Process Control System," filed on Feb. 7, 2000, which are hereby incorporated by reference herein in their entireties for all purposes. However, these control experts may additionally incorporate and use data related to the status of devices or other hardware within the process plant 10 in the decision making performed by these control experts. In particular, in the past, the software control experts generally only used process variable data and some limited device status data to make decisions or recommendations to the process operator. With the communication provided by the asset utilization expert 50, especially that related to device status information such as that provided by the computer systems 18, 14A, 22 and 26 and the data analysis tools implemented thereon, the control expert 52 can receive and incorporate device status information such as health, performance, utilization and variability information into its decision making along with process variable information.

Additionally, the asset utilization expert 50 can provide information pertaining to states of devices and the operation of the control activities within the plant 10 to the business systems 35 and 36 where, for example, a work order generation application or program 54 can automatically generate work orders and order parts based on detected problems within the plant 10 or where supplies can be ordered based on work being performed. Similarly, changes in the control system detected by the asset utilization expert 50 may cause the business systems 35 or 36 to run applications that perform scheduling and supply orders using, for example, the program 54. In the same manner, changes in customer orders etc. can be entered into the business systems 35 or 36 and this data can be sent to the asset utilization expert 50 and sent to the control routines or control expert 52 to cause changes in the control to, for example, begin making the newly ordered products or to implement the changes made in the business systems 35 and 36. Of course, if desired, each computer system connected to the bus 32 may have an application therein that functions to obtain the appropriate data from the other applications within the computer and to sending this data to, for example, the asset utilization expert 50.

Additionally, the asset utilization expert 50 can send information to one or more optimizers 55 within the plant 10. For example, a control optimizer 55 can be located in the computer 14A and can run one or more control optimization routines 55A,55B, etc. Additionally or alternatively, optimizer routines 55 could be stored in and executed by the computer 30 or any other computer, and the data necessary therefore could be sent by the asset utilization expert 50. If desired, the plant 10 may also include models 56 that model certain aspects of the plant 10 and these models 56 can be executed by the asset utilization expert 50 or a control or other expert such as the control expert 52 to perform modeling functions, the purpose of which will be described in more detail herein. Generally speaking, however, the models 56 can be used to determine device, area, unit, loop, etc. parameters, to detect faulty sensors or other faulty equipment, as part of optimizer routines 55, to generate indices such as performance and utilization indices for use in the plant 10, to perform performance or condition monitoring, as well as for many other uses. The models 56 may be models such as those created by and sold by MDC Technology located in Teeside, England or may be any other desired types of models. There are, of course, many other applications that can be provided within the plant 10 and that can use the data from the asset utilization expert 50 and the system described herein is not limited to the applications specifically mentioned herein. Overall, however, the asset utilization expert 50 helps to optimize the use of all of the assets within the plant 10 by enabling the sharing of data and coordination of assets between all of the functional areas of the plant 10.

Also, generally speaking, one or more user interface routines 58 can be stored in and executed by one or more of the computers within the plant 10. For example, the computer 30, the user interface 14A, the business system computer 35 or any other computer may run a user interface routine 58. Each user interface routine 58 can receive or subscribe to information from the asset utilization expert 50 and either the same or different sets of data may be sent to each of the user interface routines 58. Any one of the user interface routines 58 can provide different types of information using different screens to different users. For example, one of the user interface routines 58 may provide a screen or set of screens to a control operator or to a business person to enable that person to set constraints or to choose optimization variables for use in a standard control routine or in a control optimizer routine. The user interface routine 58 may provide a control guidance tool that enables a user to view the indices created by the index generation software 51 in some coordinated manner. This operator guidance tool may also enable the operator or any other person to obtain information about the states of devices, control loops, units, etc. and to easily see the information related to the problems with these entities, as that information has been detected by other software within the process plant 10. The user interface routine 58 may also provide performance monitoring screens using performance monitoring data provided by or generated by the tools 23 and 27, the maintenance programs such as the AMS application or any other maintenance programs, or as generated by the models in conjunction with the asset utilization expert 50. Of course, the user interface routine 58 may provide any user access to and enable the user to change preferences or other variables used in any or all functional areas of the plant 10.

Figure 2:
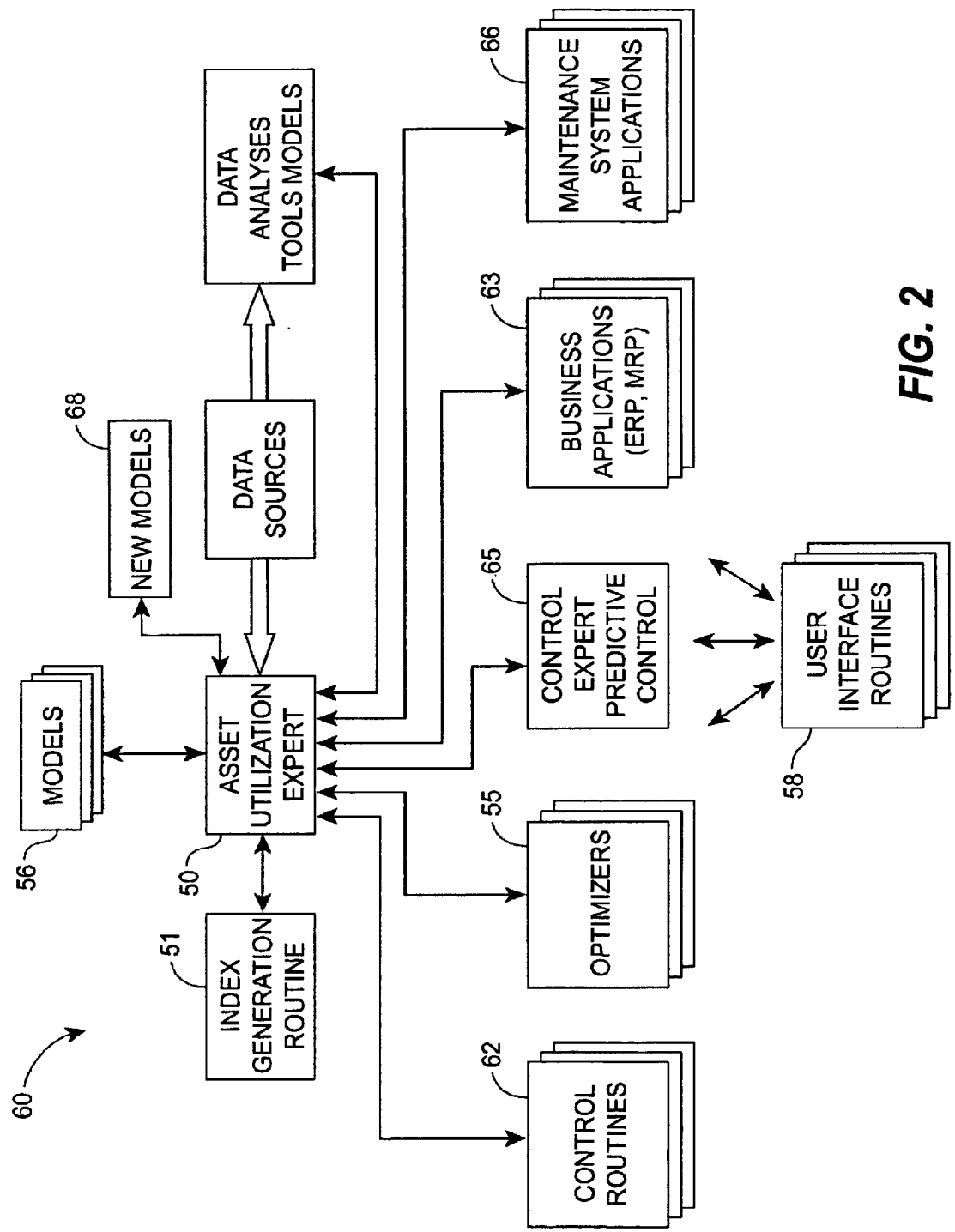
FIG. 2 is a data and information flow diagram with respect to the process plant of FIG. 1.

Referring now to FIG. 2, a data flow diagram illustrating some of the data flow between the asset utilization expert 50 and other computer tools or applications within the process plant 10 is provided. In particular, the asset utilization expert 50 may receive information from numerous data collectors or data sources such as multiplexers, transmitters, sensors, hand held devices, control systems, radio frequency (RF) transceivers, on-line control systems, web servers, historians, control modules or other control applications within the process plant 10, interfaces such as user interfaces and I/O interfaces as well as data servers such as buses (e.g., Fieldbus, HART and Ethernet buses), valves, transceivers, sensors, servers and controllers and other plant assets such as process instrumentation, rotating equipment, electrical equipment, power generation equipment, variable speed drivers, etc. This data can take on any desired form based on how the data is generated or used by other functional systems. Still further, this data may be sent to the asset utilization expert 50 using any desired or appropriate data communication protocol and communication hardware such as the XML protocol discussed above. Generally speaking, however, the plant 10 will be configured so that the asset utilization expert 50 automatically receives specific kinds of data from one or more of the data sources and so that the asset utilization expert 50 can take predetermined actions with respect to that data.

Also, the asset utilization expert 50 receives information from (and may actually execute) data analysis tools such as maintenance data analysis tools, performance tracking tools, such as those associated with devices, as well as performance tracking tools for process control systems like that described in U.S. patent application Ser. Nos. 09/256,585 and 09/499,445 identified above. The data analysis tools may also include, for example, a root cause application which detects root causes of certain types of problems, event detection such as that described in U.S. Pat. No. 6,017,143, regulatory loop diagnostics such as that disclosed in U.S. patent application Ser. No. 09/303,869, filed May 3, 1999, (which is hereby incorporated by reference herein in its entirety for all purposes) impulse lines plugging detection applications, such as that described in U.S. patent application Ser. No. 09/257,896, filed Feb. 25, 1999, (which is hereby incorporated by reference herein in its entirety for all purposes) device status applications, device configuration applications and maintenance applications, device storage, historian and information display tools, such as AMS, Explorer applications and audit trail applications. Still further, the expert 50 can receive data and any information from process control data analysis tools such as the advanced control expert 52, model predictive control process routines such as those described in U.S. patent application Ser. No. 09/593,327 (filed Jun. 14, 2000) and Ser. No. 09/412,078 (filed Oct. 4, 1999), which are hereby incorporated by reference herein in their entireties for all purposes, tuning routines, fuzzy logic control routines and neural network control routines, as well as from virtual sensors such as that described in U.S. Pat. No. 5,680,409, which may be provided within the process control system 10.

Still further, the asset utilization expert 50 may receive information from data analysis tools related to rotating equipment such as on-line vibration, RF wireless sensors and hand-held data collection units, oil analysis associated with rotating equipment, thermography, ultra-sonic systems and laser alignment and balancing systems, all of which may be related to detecting problems or the status of rotating equipment within the process plant 10.

Still further, the asset utilization expert 50 may receive data related to power management and power equipment and supplies such as the applications 23 and 27 of FIG. 1, which may include any desired power management and power equipment monitoring and analysis tools.

In one embodiment, the asset utilization expert 50 executes or oversees the execution of mathematical software models 56 of some or all of the equipment within the plant 10, such as device models, loops models, unit models, area models, etc., which are run by, for example, the computer 30 or any other desired computer within process plant 10. The asset utilization expert 50 may use the data developed by or associated with these models for a number of reasons. Some of this data (or the models themselves) may be used to provide virtual sensors within the plant 10. Some of this data, or the models themselves, may be used to implement predictive control or real time optimal control within the plant 10. Some of the data generated by the models 56 may be used by the index generation routine 51 to generate indices which are used in other applications, such as business and process control applications. The use of the models 56 for these and other purposes will be described in more detail below.

The asset utilization expert 50 receives data as it is generated or at certain periodic times over, for example, the bus 32 or other any communication network within the process plant 10. Thereafter, periodically or as needed, the asset utilization expert 50 redistributes the data to other applications or uses that data to generate and provide other information useful in different aspects of the control or operation of the process plant 10 to other function systems within the plant 10. In particular, the asset utilization expert 50 may supply data to cause the index generation routine 51 to create a series of composite indices such as a performance index, a utilization index, a health index and a variability index associated with one or more of the devices, units, loops, areas, or other entities within the process plant 10. The generation and use of these indices will also be discussed in more detail herein.

The asset utilization expert 50 may also provide data to and receive data from control routines 62 which may be located in process controllers or interfaces associated with those controllers, optimizers 55, business applications 63, maintenance applications 66, etc.

Furthermore, a control expert 65 (which may include a predictive process controller), which in the past simply assumed that the devices it was controlling either worked properly or not at all, can receive information from the asset utilization expert 50 related to the status or health of the devices it is controlling, such as the utilization, variability, health or performance indices mentioned above or other information related to the operating status of devices, loops, etc. which can be taken into account when trying to control a process. The predictive controller 65, as well as the optimizers 55 may provide additional information and data to user interface routines 58. The predictive controller 65 or optimizer 55 may use the status information pertaining to actual current status of the devices in the network, as well as take into account goals and future needs such as those identified by business solution software provided from the asset utilization expert 50 as defined by, for example, business applications 63, to optimize control based on predictions within the control system.

Still further, the asset utilization expert 50 may provide data to and receive data from enterprise resource planning tools such as those typically used in business solutions or business computers 35 and 36. These applications may include production planning tools which control production planning, material resource planning, the work order generation tool 54 which automatically generates part orders, work orders, or supply orders for use in the business applications, etc. Of course, the part order, work order and supply order generation may be completed automatically based on information from the asset utilization expert 50, which decreases the time required to recognize that an asset needs to be fixed as well as the time is takes to receive the parts necessary to provide corrective action with respect to maintenance issues.

The asset utilization expert 50 may also provide information to the maintenance system applications 66, which not only alert maintenance people to problems immediately, but also take corrective measures such as ordering parts, etc. which will be needed to correct a problem. Still further, new models 68 may be generated using types of information that are available to the asset utilization expert 50 but that were previously unavailable to any single system. Of course, it will be understood from FIG. 2 that the asset utilization expert 50 not only receives information or data from the data models and the analysis tools but, also receives information from enterprise resource tools, maintenance tools and process control tools.

Moreover, one or more coordinated user interface routines 58 may communicate with the asset utilization expert 50 as well as any other applications within the plant 10 to provide help and visualization to operators, maintenance persons, business persons, etc. The operators and other users may use the coordinated user interface routines 58 to perform or to implement predictive control, change settings of the plant 10, view help within the plant 10, or perform any other activities related to the information provided by the asset utilization expert 50. As discussed above, the user interface routines 58 may include an operator guidance tool that receives information from the predictive controller 65 as well as information related to the indices, which can be used by an operator or other user to help perform many functions such as viewing the status of a process or devices within the process, to guide the predictive controller 65 or to perform predictive or optimized control. Still further, the user interface routines 58 may be used to view data or to obtain data from any of the tools in the other parts of the process plant 10 via, for example, the asset utilization expert 50. For example, managers may want to know what is happening in the process or may need high level information related to the process plant 10 to make strategic plans.

Monitoring Rotating Equipment

As discussed above, information related to problems or status of rotating equipment in a process plant may be provided to the asset utilization expert 50 by data analysis tools. These data analysis tools may include, for example, tools that monitor the vibration exhibited by the rotating equipment. The information provided by the data analysis tools may be in the form, for example, of a measure of severity of the machine's vibration.

Several methods for determining a measure of severity of a machine's vibration are known. For example, one well-known method involves comparing a measure of overall vibration to a chart which defines acceptable overall vibration levels for rotating machines. For example, the Rathbone chart provides an allowable level of overall vibration that a machine can exhibit by ranking the machine's operating condition from extremely smooth to very rough in nine incremental steps.

Another known method of determining fault severity based upon a machine's vibration spectrum involves the calculation of values that represent the amount of energy present in certain regions, or bands, of the vibration spectrum. Several of these analysis parameter bands may be specified, each with an associated alarm limit to which a calculated parameter value can be compared. The machine's fault severity can be characterized by examining the deviation of the calculated values from their associated alarm limit, with a severity value in the range of A–D assigned for each band.

Other known methods of determining fault severity based on vibration information include detecting that a machine's vibration level has exceeded a limit level, and then determining into which of several categories of severity the vibration level falls (e.g., "slight", "moderate", "serious", or "extreme").

Additionally, U.S. Pat. No. 5,875,420, entitled "Determining Machine Operating Conditioning Based on Severity of Vibration Spectra Deviation From an Acceptable State," issued Feb. 23, 1999, describes embodiments of methods for determining fault severity based on vibration information, and is hereby incorporated by reference herein in its entirety for all purposes. In at least some of these embodiments, a deviation severity value for a machine may be determined based on the amplitudes of peaks within the machine's vibration spectrum. This deviation severity value may help characterize the severity of the machine's deviation from an acceptable state so that faults associated with one or more machines may be ranked.

Figure 3:
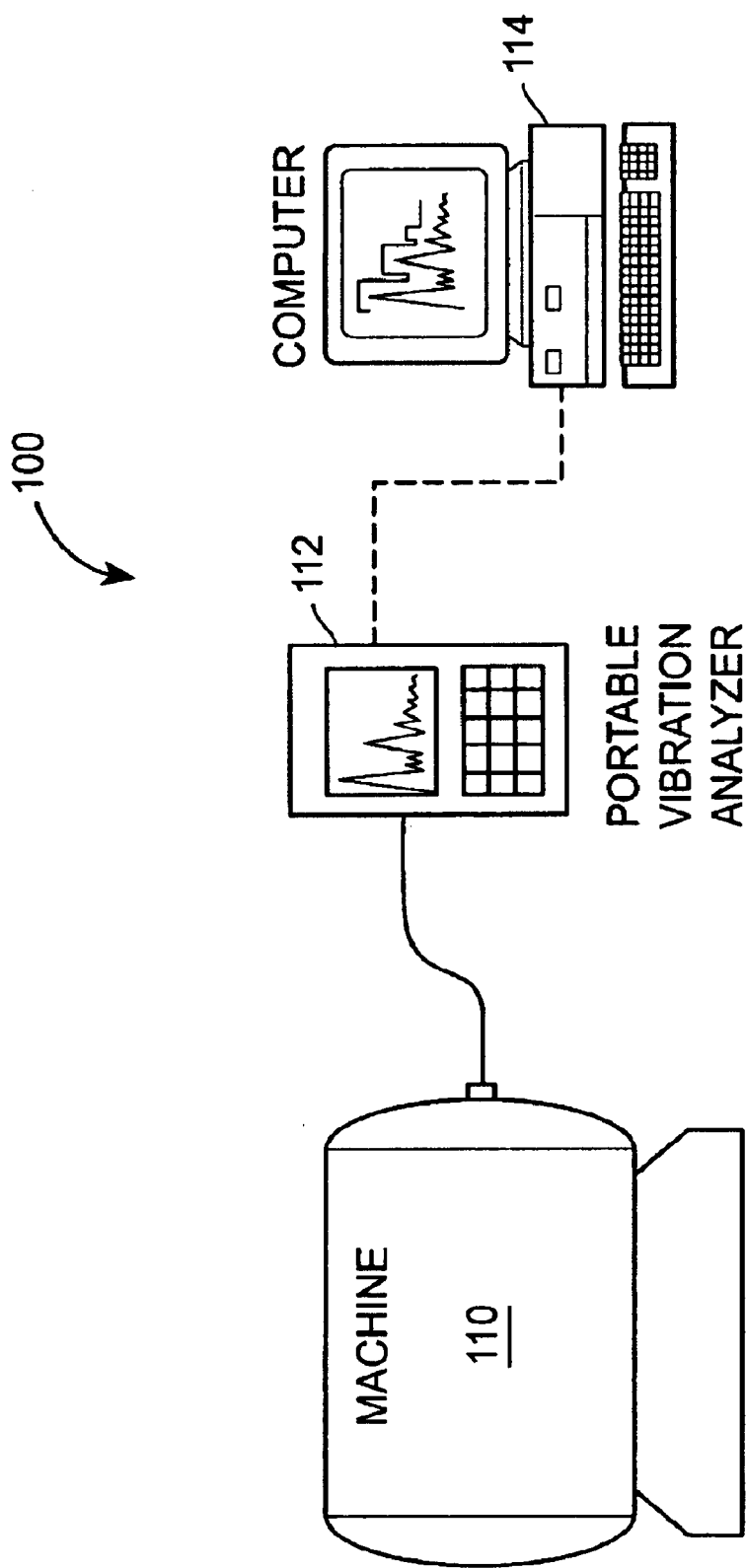
FIG. 3 is a block diagram of an example machine vibration monitoring system.

FIG. 3 illustrates an example machine vibration monitoring system 100. The machine vibration monitoring system 100 may be used to measure and analyze the vibration level of a machine 110, such as an AC induction motor. By monitoring the machine's vibration spectra, the operational condition of the machine may be deduced. The system 100 includes a device, such as the portable vibration analyzer 112 that collects, stores, and/or analyzes vibration data from one or more machines, and a computer 114 which stores and analyzes vibration data, such as data which has been downloaded from the portable vibration analyzer 112.

An analysis performed by the portable vibration analyzer 112 and/or the computer 14 in such a system 100 may include transforming the machine's vibration data into vibration frequency spectra, defining a vibration amplitude limit above which the machine's vibration level is considered abnormal, determining whether the machine's vibration level has exceeded the defined limits, and generating a qualitative value which can characterize the severity of an abnormal vibration condition. This qualitative value may, for example, permit an operator to make an informed decision about the priority to assign to the problem with the machine 110. The qualitative value may be, for example, the deviation severity value described in U.S. Pat. No. 5,875,420. The qualitative value may also be determined according to other methods, such as the known methods of determining measures of fault severity described above.

Figure 4:
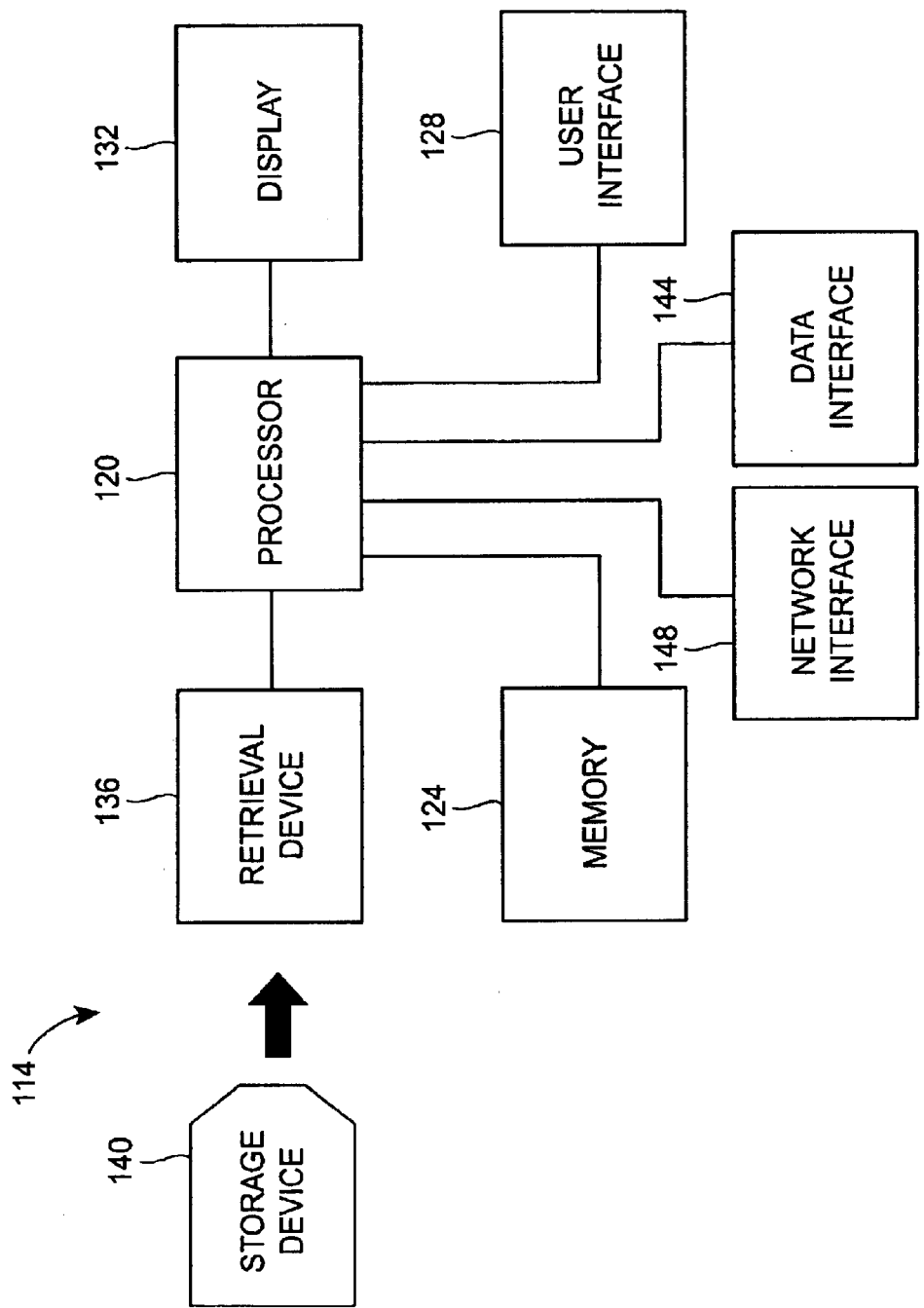
FIG. 4 is a block diagram of the example computer of FIG. 3.

FIG. 4 illustrates an example of the computer 114 of FIG. 3. The computer 114 may comprise a processor 120 coupled to a memory 124, a user interface 128, and a display unit 132. The memory 124 may comprise volatile memory, such as read-only-memory (RAM), and may also comprise non-volatile memory, such as a hard-disk drive, a floppy disk drive, read-only memory, FLASH memory, etc. Data representing a machine's test vibration spectrum may be made available to the processor 120 via, for example, a data interface 144, or the data may reside in memory 124 where it is readable by the processor 120. Alternatively, the test vibration spectrum data may be downloaded to the processor 120 or the memory 124 via, for example, a data retrieval device 136, such as a disk or tape drive, and a data storage device 140, such as a magnetic disk or tape. Additionally, the test vibration spectrum data may be downloaded via, for example, the data interface 144 or a network interface 148.

When the test vibration spectrum data have been made available to the processor 120, the processor 120 may execute a process, such as one of the processes describe in U.S. Pat. No. 5,875,420 that generates one or more deviation severity values. The processor 120 may execute the process steps according to software stored in the memory 124.

Referring again to FIG. 1, the computer 114 may be coupled to the computer 22. Alternatively, the computer 22 may comprise the computer 114. The computer 22 may receive or generate deviation severity values corresponding to the rotating equipment 20. Then, these severity values may be stored in the database (not shown) coupled to computer 22. Table 1 is one example of possible severity values that may be stored in the database.

TABLE 1

| Deviation Severity Value | Severity Description |
| --- | --- |
| −1 | No Status |
| 0 | Normal |
| 1–19 | Alert |
| 20–39 | Alarm |
| 40–69 | Extreme |
| 70–99 | Catastrophic |

As can be seen in Table 1, a severity value of 0 indicates that the monitored machine's vibration appears normal, whereas severity values from 1–99 indicate an abnormal condition with varying degrees of severity. Specifically, a value of 1 indicates an abnormal condition with the lowest severity (an alert) and a value of 99 indicates an abnormal condition with the most severity (a catastrophic condition). Additionally, a value of −1 indicates that no status is available for the monitored machine. This may indicate, for example, that communication with the computer 114 and/or the vibration analyzer 112 (FIG. 3) is not occurring.

Health Index

As described above with reference to FIGS. 1 and 2, the asset utilization expert 50, which may be implemented by, for example, computer 30, collects data and other information generated by the process control systems 12 and 14, the maintenance systems 18, 22 and 26 and the business systems 35 and 36 as well as information generated by data analysis tools executed in each of these systems.

Also as described above, the asset utilization expert 50 may include or execute index generation software 51 that creates indices associated with devices, like process control and instrumentation devices, power generation devices, rotating equipment, units, areas, etc, or that are associated with process control entities, like loops, etc. within the plant 10. These indices can then be provided to the process control applications to help optimize process control and can be provided to the business software or business applications to provide the business persons more complete or understandable information associated with the operation of the plant 10.

U.S. patent application Ser. No. 10/085,439, filed on Feb. 28, 2002, and entitled "Creation and Display of Indices Within a Process Plant," which is hereby incorporated by reference herein in its entirety for all purposes, describes examples of several indices that may be generated by the index generation software 51. These indices may be used to quantify various characteristics about individual entities, in a process plant such as devices, equipment, etc., or characteristics about logical or physical groupings of individual entities. For example, a performance index may indicate the relative performance of a device, unit, area, etc. within a plant. Additionally, a variability index may indicate how much a parameter, signal, etc. vanes as compared to how much it is expected to vary. Also, a utilization index may indicate the utilization of individual devices, units, loops, etc. Further, a health index may indicate the health of certain devices, or other entities in the process plant 10.

Table 2 is one example of values that may compose a health index used by the various computer systems in the process plant 10.

TABLE 2

| Health Index Value | Description |
| --- | --- |
| 0 | No Communication |
| 1–19 | Failed |
| 20–79 | Needs Maintenance |
| 80–99 | Advisory |
| 100 | Normal |

As can be seen in Table 2, a health index value of 100 indicates that the operating condition of the corresponding entity or group of entities is normal, whereas health index values from 1–99 indicate varying degrees of sub-optimal conditions. Specifically, a value of 1 indicates a worst condition (failed) and a value of 99 indicates an abnormal condition with the lowest priority (advisory). Additionally, a value of 0 indicates that communication with the corresponding entity or group of entities has failed.

Determining Health Indices for Rotating Equipment

Figure 5:
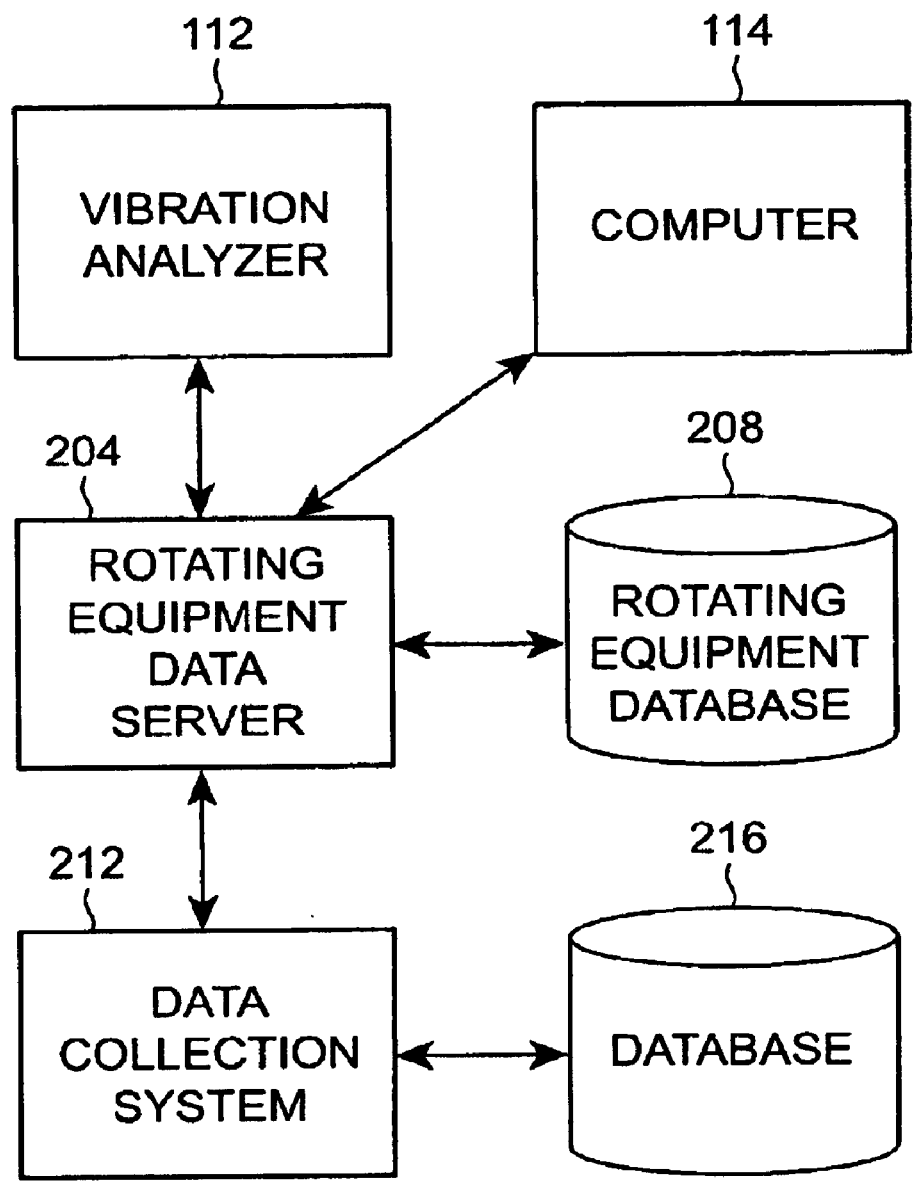
FIG. 5 is a diagram of information and data flow in a portion of a process plant.

FIG. 5 is a diagram of information and data flow in a portion of a process plant such as the process plant 10 of FIG. 1. A rotating equipment data server 204 may be coupled to one or more vibration analyzers 112 described with reference to FIG. 3. Additionally, or alternatively, the rotating equipment data server 204 may be coupled to one or more computers 114 described with reference to FIGS. 3 and 4. Further, the rotating equipment data server 204 may comprise a computer 114.

Additionally, the rotating equipment data server 204 is coupled to a rotating equipment database 208. Referring to FIGS. 1, 3, and 4, the rotating equipment data server 204 may receive information related to the operational status of rotating equipment 22 from the computer(s) 114, and may store this information in the rotating equipment database 208. Additionally or alternatively, the rotating equipment data server 204 may receive vibration data from the vibration analyzer(s) 112, and may generate information related to the operational status of rotating equipment 22. Similarly, this generated information may be stored in the rotating equipment database 208. The information related to the operational status of rotating equipment 22 may include deviation severity values as described above. Referring to FIG. 1, the rotating equipment data server 204 may be implemented by, or communicatively coupled to, the computer 22.

The rotating equipment data server 204 is communicatively coupled to a data collection system 212. The data collection system 212 may store some or all of the data it collects in a database 216. Referring to FIG. 1, the data collection system 212 may be implemented by the computer system 30. The data collection system 212 may be a component of the asset utilization expert 50. The rotating equipment data server 204 and the data collection system 212 may communicate data to each other via a bus or a network such as a LAN, a WAN, the Internet, etc. Such data communication may be implemented using, for example, the XML protocol or any other suitable protocol.

Generally speaking, the rotating equipment data server 204 generates health index values associated with various rotating equipment and then transmits those health index values to the data collection system 212. The data collection system 212 may then make the health index values associated with the various rotating equipment available to other various other applications, such as user interfaces, maintenance systems, asset managements systems, control systems, models, diagnostic systems, business systems, etc.

Figure 6:
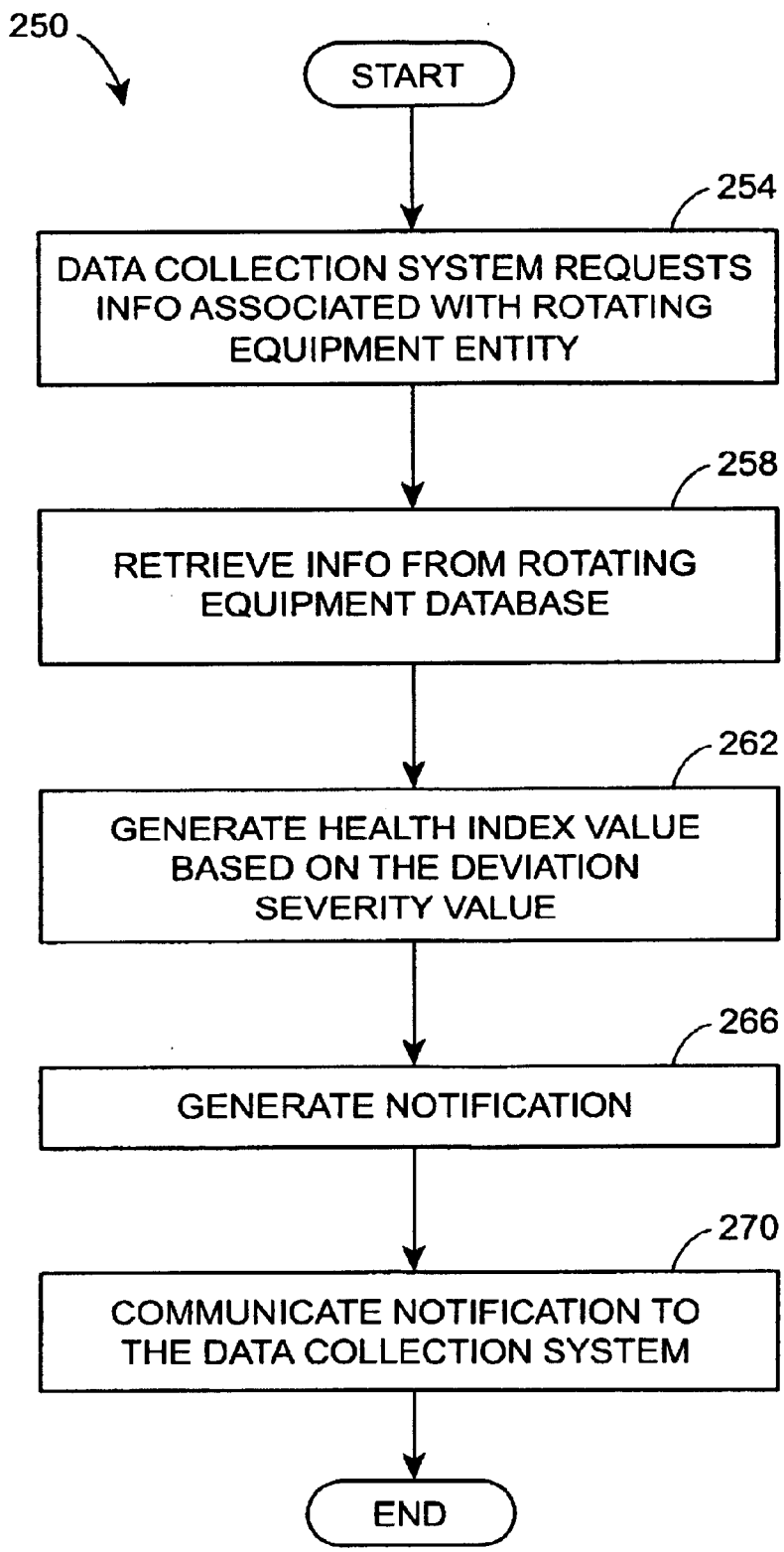
FIG. 6 is a flow diagram of a method that may be implemented by a portion of a process plant.

FIG. 6 is a flow diagram of a method 250 that may be implemented by a portion of a process plant such as the portion illustrated in FIG. 5, and will be described with reference to FIG. 5. At block 254, the data collection system 212 requests operational status information associated with one or more rotating equipment entities. The data collections system 212 may request the operational status information periodically, in response to some triggering event, etc.

For ease of explanation, the remaining description will assume that the request (block 254) is related to only one rotating equipment entity. It is to be understood, however, that the flow of FIG. 6 may apply to instances in which operation status information related to multiple rotating equipment entities have been requested.

At block 258, the rotating equipment data server 204 retrieves operational status information related to the rotating equipment entity from the rotating equipment database 208. The information stored in the database associated with the entity includes a deviation severity value, as discussed above, for that entity.

At block 262, the rotating equipment data server 204 generates a health index value based on the deviation severity value retrieved from the rotating equipment database 208. The health index value may be generated using a variety of techniques such as generating the health index value based on one or more equations, using a look up table, etc.

Figure 7:
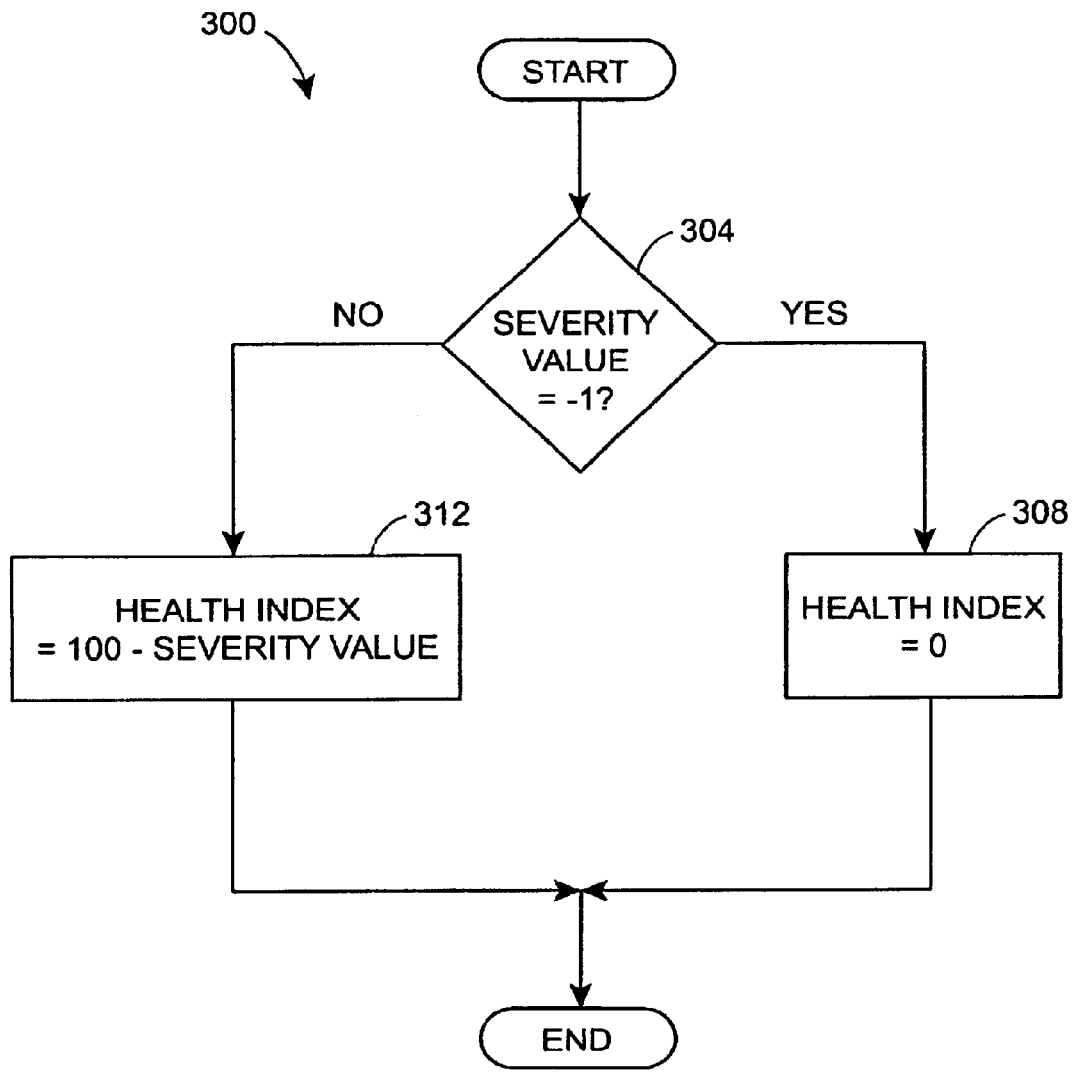
FIG. 7 is a flow diagram of a method for generating a health index value based on a severity value.

FIG. 7 illustrates a flow diagram of one embodiment of a method 300 for generating a health index value based on a deviation severity value. In particular, the method 300 provides a technique for converting a deviation severity value from the example deviation severity values of Table 1 into a health index value from the example health index values of Table 2.

At block 304, it is determined whether the severity value equals −1. As an alternative, it could be determined whether the severity value is less than zero. If the severity value is −1, the flow proceeds to block 308. If the severity value is not −1, the flow proceeds to block 312.

At block 308, the health index is determined to be 0. At block 312, the health index is determined as 100 minus the severity value.

One of ordinary skill in the art will recognize many variations to the flow of FIG. 7. For example, blocks may be combined with other blocks or eliminated. Additionally, one of ordinary skill in the art will recognize that the flow of FIG. 7 may be implemented as a look-up table.

Further, the flow of FIG. 7 assumes that the example deviation severity values of Table 1 and the example health index values of Table 2 are used. One of ordinary skill in the art will recognize that if other types of qualitative measures are used, the flow of FIG. 7 can be modified.

Referring again to FIG. 6, at block 266, the rotating equipment data server 204 may generate a notification that includes the health index value generated at block 262 and an indication of the rotating equipment entity with which the health index value is associated. The message may also include other information such as the severity value, a recommended action, a category associated with the health index value (e.g., "No Communication," "Failed," "Needs Maintenance," "Advisory," "Normal"), etc. The notification generated at block 266 may be in the format of a device alert according to a protocol such as the Fieldbus protocol or the HART protocol.

At block 270, the rotating equipment data server 204 transmits the notification generated at block 266 to the data collection system 212. The notification may be transmitted via, for example, the XML protocol or any other suitable protocol.

One of ordinary skill in the art will recognize many variations to the flow of FIG. 6. For example, blocks may be combined with other blocks or eliminated. Additionally, the health index value need not be generated (block 262) upon receiving a request for information from the data collection system 212. As one alternative, the health index value may be generated ahead of time and stored in the rotating equipment database 208.

Each of the methods described herein may be implemented, for example, via a processor configured via a software program. The program may be embodied in software stored on a tangible medium such as CD-ROM, a floppy disk, a hard drive, a digital versatile disk (DVD), or a memory associated with, and/or coupled to, the processor, but persons of ordinary skill in the art will readily appreciate that the entire program or parts thereof could alternatively be executed by a device other than a processor, and/or embodied in firmware and/or dedicated hardware in a well known manner.

While the invention is susceptible to various modifications and alternative constructions, certain illustrative embodiments thereof have been shown in the drawings and are described in detail herein. It should be understood, however, that there is no intention to limit the disclosure to the specific forms disclosed, but on the contrary, the intention is to cover all modifications, alternative constructions and equivalents falling within the spirit and scope of the disclosure as defined by the appended claims.

What is claimed is:

1. A method of processing information related to operational condition of machines in a process plant, the method comprising:
   receiving a first value associated with a monitored machine, the first value from a range of values in a first index, wherein at least a portion of the range of values in the first index is indicative of varying degrees of deviation from an acceptable operational state of the monitored machine;
   generating a second value based on the first value, the second value from a range of values in a second index, the second index different from the first index, the second index indicative of varying degrees of relative health of a process entity adapted for use in process plants; and
   generating a notification associated with the monitored machine, the notification including the second value.

2. A method as defined in claim 1, wherein the monitored machine comprises a rotating machine.

3. A method as defined in claim 2, wherein the at least a portion of the range of values in the first index is based on vibration information associated with the monitored machine.

4. A method as defined in claim 1, wherein increasing values in the at least a portion of the range of values in the first index are indicative of increasing deviation from an acceptable operational state of a machine adapted for use in process plants.

5. A method as defined in claim 1, wherein decreasing values in the at least a portion of the range of values in the first index are indicative of increasing deviation from an acceptable operational state of a machine adapted for use in process plants.

6. A method as defined in claim 1, wherein increasing values in at least a portion of the range of values in the second index are indicative of better relative health of a process entity adapted for use in process plants.

7. A method as defined in claim 1, wherein decreasing values in at least a portion of the range of values in the second index are indicative of better relative health of a process entity adapted for use in process plants.

8. A method as defined in claim 1, wherein generating the second value based on the first value comprises calculating the second value according to at least one equation.

9. A method as defined in claim 1, wherein generating the second value based on the first value comprises looking up the second value in a look-up table.

10. A method as defined in claim 1, wherein the notification includes the first value.

11. A method as defined in claim 1, wherein at least one value in the range of values in the first index is indicative of a lack of information regarding the operational condition of the monitored machine.

12. A method as defined in claim 1, at least one value in the range of values in the second index is indicative of a lack of information regarding the operational condition of the monitored machine.

13. A method as defined in claim 1, wherein at least one value in the range of values in the second index is indicative of a failed condition.

14. A method as defined in claim 1, wherein at least one value in the range of values in the second index is indicative of a maintenance needed condition.

15. A method as defined in claim 1, wherein at least one value in the range of values in the second index is indicative of an advisory condition.

16. A method as defined in claim 1, wherein at least one value in the range of values in the second index is indicative of a normal condition.

17. A method as defined in claim 1, further comprising:
   receiving a request for information associated with the monitored machine; and
   in response to the request, retrieving the first value from a database.

18. A method as defined in claim 17, wherein the request is received from a requesting computer via a network, the method further comprising:
   in response to the request, communicating the notification to the requesting computer via the network.

19. An article of manufacture comprising a tangible medium storing machine readable instructions adapted to be executed by a processor, the machine readable instructions comprising:
   first code for receiving a first value associated with a monitored machine, the first value from a range of values in a first index, wherein at least a portion of the range of values in the first index is indicative of varying degrees of deviation from an acceptable operational state of the monitored machine;
   second code for generating a second value based on the first value, the second value from a range of values in a second index, the second index different from the first index, the second index indicative of varying degrees of relative health of a process entity adapted for use in process plants; and
   third code for generating a notification associated with the monitored machine, the notification including the second value.

20. A article of manufacture as defined in claim 19, wherein the monitored machine comprises a rotating machine.

21. A article of manufacture as defined in claim 20, wherein the at least a portion of the range of values in The first index is based on vibration information associated with the monitored machine.

22. A article of manufacture as defined in claim 19, wherein increasing values in the at least a portion of the range of values in the first index are indicative of increasing deviation from an acceptable operational state of a machine adapted for use in process plants.

23. A article of manufacture as defined in claim 19, wherein decreasing values in the at least a portion of the range of values in the first index are indicative of increasing deviation from an acceptable operational state of a machine adapted for use in process plants.

24. A article of manufacture as defined in claim 19, wherein increasing values in at least a portion of the range of values in the second index are indicative of better relative health of a process entity adapted for use in process plants.

25. A article of manufacture as defined in claim 19, wherein decreasing values in at least a portion of the range of values in the second index are indicative of better relative health of a process entity adapted for use in process plants.

26. A article of manufacture as defined in claim 19, wherein at least one value in the range of values in the first index is indicative of a lack of information regarding the operational status of the monitored machine.

27. A article of manufacture as defined in claim 19, further comprising:
   fourth code for receiving a request for information associated with the monitored machine; and
   fifth code for, in response to the request, retrieving the first value from a database.

28. A article of manufacture as defined in claim 27, further comprising sixth code for, in response to the request, communicating the notification to a computer via a network.

29. A article of manufacture as defined in claim 19, wherein the second code for generating the second value based on the first value comprises code for calculating the second value according to at least one equation.

30. A article of manufacture as defined in claim 19, wherein the second code for generating the second value based on the first value comprises code for looking up the second value in a look-up table.

31. A article of manufacture as defined in claim 19, wherein the notification includes the first value.

32. A article of manufacture as defined in claim 19, wherein at least one value in the range of values in the second index is indicative of a lack of information regarding the operational condition of the monitored machine.

33. A article of manufacture as defined in claim 19, wherein at least one value in the range of values in the second index is indicative of a failed condition.

34. A article of manufacture as defined in claim 19, wherein at least one value in the range of values in the second index is indicative of a maintenance needed condition.

35. A article of manufacture as defined in claim 19, wherein at least one value in the range of values in the second index is indicative of an advisory condition.

36. A article of manufacture as defined in claim 19, wherein at least one value in the range of values in the second index is indicative of a normal condition.

37. An apparatus for processing information related to operational condition of machines in a process plant, the apparatus comprising:
   a memory;
   a processor coupled to the memory, the processor programmed to,
      receive a first value associated with a monitored machine, the first value from a range of values in a first index, wherein at least a portion of the range of values in the first index is indicative of varying degrees of deviation from an acceptable operational state of the monitored machine,
      generate a second value based on the first value, the second value from a range of values in a second index, the second index different from the first index, the second index indicative of varying degrees of relative health of a process entity adapted for use in process plants; and
      generate a notification associated with the monitored machine, the notification including the second value.

* * * * *

UNITED STATES PATENT AND TRADEMARK OFFICE
CERTIFICATE OF CORRECTION

PATENT NO.    : 6,915,235 B2
DATED         : July 5, 2005
INVENTOR(S)   : Reeves et al.

It is certified that error appears in the above-identified patent and that said Letters Patent is hereby corrected as shown below:

Column 5,
Line 56, delete "other" following "or".

Column 6,
Line 5, delete "a" following "such".

Column 10,
Line 54, delete "other any" and insert -- any other --.

Column 11,
Line 37, delete "is" and insert "it".

Column 13,
Line 37, delete "describe" and insert -- described --.

Column 14,
Line 34, delete "vanes" and insert -- varies --.

Column 18,
Lines 39, 42, 46, 51, 56, 60 and 64, delete "A article" and insert -- An article --.

Column 19,
Lines 1, 7, 10, 14, 18, 20, 24 and 27, delete "A article" and insert -- An article --.

Column 20,
Lines 1 and 4, delete "A article" and insert -- An article --.

Signed and Sealed this

Third Day of January, 2006

JON W. DUDAS
*Director of the United States Patent and Trademark Office*